Jan. 24, 1967     G. F. EAST     3,299,718

GYROSCOPE

Filed July 11, 1963

INVENTOR.
GEORGE F. EAST
BY
ATTORNEY

United States Patent Office 3,299,718
Patented Jan. 24, 1967

3,299,718
GYROSCOPE
George F. East, Whittier, Calif., assignor to Clary Corporation, San Gabriel, Calif., a corporation of California
Filed July 11, 1963, Ser. No. 294,444
8 Claims. (Cl. 74—5.12)

This invention relates to gyroscopes and has particular reference to spring driven gyroscopes which are especially applicable to use in guided missiles and the like having an operational life ranging from several seconds to several minutes.

Gyroscopes of the above type are generally supported for two degrees of movement so that the rotor maintains a fixed attitude in space during travel of the missile. Attitude pickoff devices are provided to indicate the displacement of the missile relative to the spin axis of the gyroscope rotor, which indications are either transmitted back to a control station or are applied to a control system within the gyroscope which, in turn, directly effects or corrects changes in the attitude of the missile.

Gyroscopes of the above type are generally maintained in caged condition during storage and are uncaged at the time of firing the missile and after the rotor has been brought up to full operational speed. Upon reaching such speed, the spring must be disconnected from the rotor to permit free rotation of the latter during subsequent travel of the missile.

Since missiles of the above type must often be fired at precise times and quite often with no advance notice, it is imperative that such rotor be brought up to speed with a minimum time delay and uncaging take place precisely thereafter so that such operation will not unduly delay firing of the missile.

Since such missiles are generally expendable, it is highly desirable that the gyroscope be inexpensive and that various operations of the gyroscope be carried out without expensive complicated timing controls.

It therefore becomes a principal object of the present invention to provide an inexpensive and highly reliable spring driven gyroscope for controlling guided missiles and the like.

Another object is to provide a miniature compact spring driven gyroscope which may be manufactured in an extremely small size.

Another object is to provide an inexpensive spring driven gyroscope in which only a single signal is required to release the drive spring, to disconnect the drive means from the rotor and to uncage the gyroscope in proper sequence.

A further object is to prove a spring driven gyroscope for missiles and the like having a minimum weight and yet rugged enough to withstand any variations encountered by the missile.

The manner in which the above and other objects of the invention are to be accomplished can be readily understood on reference to the following specification when read in conjunction with the accompanying drawings, wherein.

Figure 1:
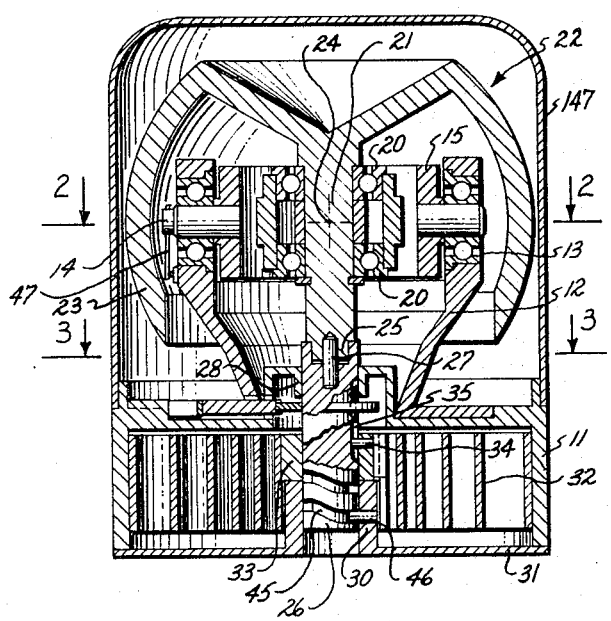
FIG. 1 is a sectional view through a miniature gyroscope illustrating a preferred form of the present invention.
Figure 3:
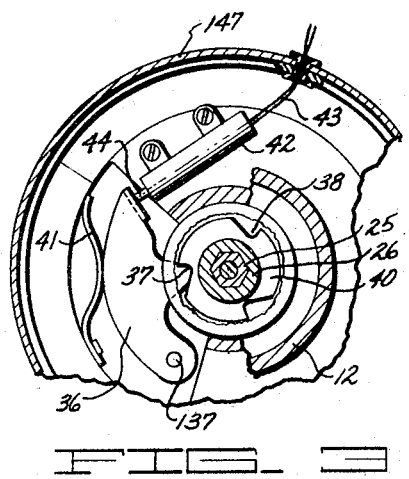
FIG. 3 is a transverse sectional view with parts broken away and is taken substantially along the line 3—3 of FIG. 1 to illustrate the spring release mechanism.
Figure 2:
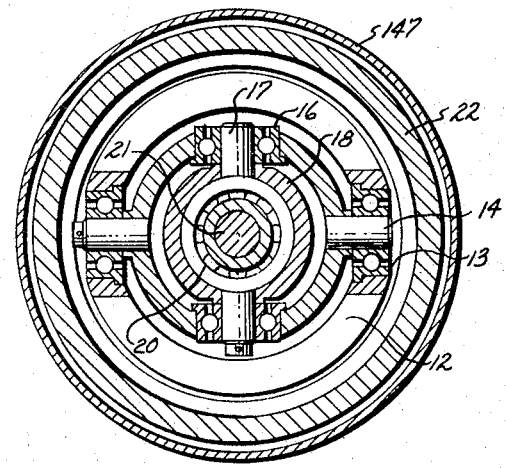
FIG. 2 is a transverse sectional view taken along the line 2—2 illustrating the gimbal mounting.

Referring to the drawings, the gyroscope comprises a cup-shaped base 11 to which is suitably secured a gimbal support bracket 12. The latter supports ball bearings 13 in which are mounted coaxially arranged trunnions 14 integral with an outer gimbal ring 15. The latter supports ball bearings 16 which rotatably support the coaxial trunnions 17 of an inner gimbal ring 18. The ring 18 supports two spaced ball bearings 20 which rotatably support a shaft 21 integral with a hollow rotor 22. The rim 23 of the rotor surrounds the gimbal bracket 12 and is arcuate in cross section, with its center of curvature coincident with the center of mass of the rotor and coincident with the intersection 24 of the mutually perpendicular axes of the trunnions 14 and 17. Such intersection is also coincident with the spin axis of the rotor.

The shaft 21 extends below the intersection 24 and terminates in a hexagonally shaped section 25 which is normally fitted in a mating socket formed in the upper end of a screw shaft 26. The section 25 and socket form coupling parts enabling the shaft 26 to drive the rotor up to its operating speed. An axially extending pin 27 is embedded in the upper end of shaft 26 and is received in an axially extending hole in the rotor shaft 21 to normally cage the gyro relative to the base 11.

The screw shaft 26 is rotably supported adjacent its upper end in a bearing 28 formed in the radial wall of the base 11. The shaft is also rotatably supported adjacent its lower end in a nut member 30 integral with a cover plate 31 which is suitably secured to the lower end of the base 11.

The base 11 and cover plate 31 form a spring chamber in which a torsion type motor spring 32 is located. The latter is formed of continuous helical convolutions, the outer end of which is suitably attached to the skirt of the base 11. The inner end of the spring is suitably attached to a sleeve 33 slideably mounted on the screw shaft. A key or pin 34 is fixed in the sleeve and is guided in a longitudinally extending keyway 35 formed in the screw shaft to transmit rotation from the spring to the shaft.

The spring 32 is normally retained in an energized or wound condition by a pawl 36 pivoted at 37 to the radial wall of the base 11 and provided with a detenting tip 37 engageable in any of three detent notches 38 formed in a disc 40 integral with the shaft 26. A leaf spring 41 is suitably attached to the base 11 and yieldably holds the pawl in engagement with the disc 40.

The pawl 36 is actuated to release the spring 32 by an explosive squib 42 which is mounted on the base 11. The squib contains a powder charge which is fired through electrical conductors 43. When so fired, a plunger 44 on the squib will be extended to rock the pawl 36 out of detenting engagement with the disc 40. The motor spring 32 thus becomes effective to rotate the shaft 26 through sleeve 33, causing screw threads 45 to screw past a pin 46 fixed in the nut member 30 so as to drive the shaft 26 downwardly. The sleeve 33 bears against the upper end of the nut member during the downward movement of the shaft and is thus retained in position.

The drive spring 32 is of such strength as to bring the rotor up to proper speed in a very short time. Thus, by the time the socket on the shaft 26 has receded from the hexagonal coupling section 25, the rotor will be rotating at its fully rated speed.

It will be noted that the pin 27 extends slightly beyond the upper end of the socket so that it will uncage the rotor shortly after the latter has been uncoupled from the shaft 26.

Suitable attitude pick-off devices generally indicated at 47 are provided to indicate the attitude of the base relative to the rotor spin axis.

A thin cup-shaped shell 147 is suitably attached to the base 11 and surrounds the rotor 23 to protect the interior of the gyroscope from atmospheric impurities and the like.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto. Also, although the gyroscope is especially adapted for manufacture in miniature sizes where the overall length is on the order of 2 inches or less, it may also be made in larger sizes.

Having thus described the invention, what is desired to be secured by United States Letters Patent is:

1. A gyroscope device comprising a rotor having a first coupling part, means supporting said rotor for rotation about a spin axis and for movement about mutually perpendicular axes, a stationary nut member, a screw member threaded in said nut member, said screw member having a second coupling part initially coupled to said first coupling part, a sleeve over said screw member, spring means for rotating said sleeve about the axis of said screw member, means drivingly connecting said sleeve to said screw member, said last mentioned means preventing relative rotation and permitting axial movement of said screw member relative to said sleeve, and means preventing axial movement of said sleeve relative to said nut member, said screw member being effective upon rotation thereof by said sleeve to subsequently uncouple said coupling parts.

2. A gyroscope device comprising a rotor having a first coupling part, means supporting said rotor for movement about a spin axis and for movement about mutually perpendicular axes, a nut member, means supporting said nut member in fixed relation to said first mentioned means, a screw member threaded in said nut member, said nut member supporting said screw member adjacent one end of said screw member, bearing means supporting said screw member adjacent the opposite end thereof, said screw member having a second coupling part adjacent said opposite end, said coupling parts being initially coupled together, a sleeve slideably mounted on said screw member, spring means for rotating said sleeve about the axis of said screw member, means drivingly connecting said sleeve to said screw member, said last mentioned means forming a splined connection between said sleeve and said screw member for preventing relative rotation and permitting axial movement of said screw member relative to said sleeve, and means for preventing axial movement of said sleeve relative to said nut member in at least one direction, and said screw member being effective upon rotation thereof to subsequently withdraw said second coupling part from coupling relation with said first coupling part.

3. A gyroscope according to claim 2 wherein said sleeve is located intermediate said nut member and said bearing means.

4. A gyroscope according to claim 2 wherein said nut member retains said sleeve against axial movement during threading of said screw member through said nut member.

5. A gyroscope device comprising a casing, a rotor in said casing having a first coupling part, means supporting said rotor for movement about a spin axis and for movement about mutually perpendicular axes, a nut member integral with said casing, rotary drive means for said rotor including a screw member threaded in said nut member, said screw member having a second coupling part initially coupled to said first coupling part, a sleeve slideably mounted on said screw member, spring means for rotating said sleeve, means drivingly connecting said sleeve to said screw member, said last mentioned means preventing relative rotation and permitting relative axial movement between said screw member and said sleeve member, and means preventing axial movement of said sleeve relative to said nut member, and said screw member being effective upon rotation thereof to subsequently uncouple said coupling parts.

6. A gyroscope device comprising a casing, a rotor having a first coupling part, means supporting said rotor in said casing for movement about a spin axis and for movement about mutually perpendicular axes, a nut member integral with one wall of said casing, a screw member threaded adjacent one end thereof in said nut member, means rotatably supporting said screw member adjacent the opposite end thereof, said screw member having a second coupling part adjacent said opposite end initially coupled to said first coupling part, a sleeve slideably mounted on said screw member intermediate said nut member and said supporting means, spring means for rotating said sleeve, means drivingly connecting said sleeve to said screw member, said last mentioned means preventing relative rotation and permitting relative axial movement between said screw member and said sleeve, and means preventing axial movement of said sleeve relative to said screw member, and said screw member being effective upon rotation thereof to subsequently uncouple said coupling parts.

7. A gyroscope comprising a casing, a rotor having a first coupling part, means supporting said rotor in said casing for movement about a spin axis and for movement about mutually perpendicular axes, a nut member integral with one wall of said casing, a screw member threaded adjacent one end thereof in said nut member, a bearing integral with another wall of said casing for supporting said screw member adjacent the opposite end thereof, said screw member having a second coupling member adjacent said opposite end initially coupled to said first coupling part, a sleeve slideably mounted on said screw member intermediate said nut member and said bearing, spring means for rotating said sleeve, and means drivingly connecting said sleeve to said screw member, said last mentioned means forming a splined connection between said sleeve and said screw member permitting axial movement of said screw member relative to said sleeve, said nut member preventing axial movement of said sleeve, and said screw member being effective upon threading into said nut to subsequently uncouple said coupling parts.

8. A gyroscope comprising a casing, a rotor having a first coupling part, means supporting said rotor in said casing for movement about a spin axis and for movement about mutually perpendicular axes, a nut member integral with one wall of said casing, a shaft having screw threads adjacent one end thereof, said shaft being threaded into said nut member adjacent said one end, a bearing integral with another wall of said casing for supporting said shaft adjacent the opposite end thereof, said shaft having a second coupling member adjacent said opposite end initially coupled to said first coupling part, said shaft having a longitudinal extending keyway thereon, a sleeve slideably mounted on said shaft intermediate said nut member and said bearing, a key on said sleeve extending into said keyway for preventing relative rotation and permitting relative axial movement between said sleeve and said shaft, said nut member preventing axial movement of said sleeve, spring means for rotating said sleeve, a latch device carried by said casing and initially engaging said shaft whereby to prevent rotation of said sleeve, and means for releasing said latch device, said shaft being effective upon threading into said nut to subsequently uncouple said coupled parts.

References Cited by the Examiner
FOREIGN PATENTS 211,412    11/1957    Australia.

FRED C. MATTERN, JR., *Primary Examiner.*

PALMER W. SULLIVAN, *Examiner.*